United States Patent
Do et al.

(10) Patent No.: US 11,796,982 B2
(45) Date of Patent: Oct. 24, 2023

(54) METHOD OF PREDICTING FAILURE EVENTS FOR RECIPROCATING COMPRESSORS

(71) Applicant: GE Oil & Gas, LLC, Houston, TX (US)

(72) Inventors: Vinh Do, Edmond, OK (US); Sheldon McCrackin, Oklahoma City, OK (US); Gregory David Adams, Oklahoma City, OK (US); Sam Stroder, Edmond, OK (US)

(73) Assignee: GE Oil & Gas, LLC, Houston, TX (US)

( * ) Notice: Subject to any disclaimer, the term of this patent is extended or adjusted under 35 U.S.C. 154(b) by 655 days.

(21) Appl. No.: 17/015,061

(22) Filed: Sep. 8, 2020

(65) Prior Publication Data
US 2021/0072733 A1 Mar. 11, 2021

Related U.S. Application Data

(60) Provisional application No. 62/897,810, filed on Sep. 9, 2019.

(51) Int. Cl.
*G05B 19/4155* (2006.01)
*G05B 23/02* (2006.01)
*F04B 51/00* (2006.01)

(52) U.S. Cl.
CPC .......... *G05B 19/4155* (2013.01); *F04B 51/00* (2013.01); *G05B 23/0283* (2013.01);
(Continued)

(58) Field of Classification Search
None
See application file for complete search history.

(56) References Cited

U.S. PATENT DOCUMENTS 8,366,402 B2 * 2/2013 St. Michel .............. F04B 19/22
417/63
10,698,399 B2 * 6/2020 Brownie ............ G05B 23/0275
(Continued)

FOREIGN PATENT DOCUMENTS

JP        2020200791 A  * 12/2020
WO   WO-2016126328 A1  *  8/2016

OTHER PUBLICATIONS

ISA/US; Search Report and Written Opinion for Corresponding PCT Application PCT/US2020/049889; dated Dec. 21, 2020.

*Primary Examiner* — Mohammad Ali
*Assistant Examiner* — David Earl Ogg
(74) *Attorney, Agent, or Firm* — Crowe & Dunlevy, P.C.

(57) ABSTRACT

A system and process for predicting the failure of a machine begins with the step of loading a slope signature library into the control system, in which the slope signature library correlates time-to-failure based on rates of change of one or more measured conditions. The process includes the steps of activating the machine, determining baseline measurements, and detecting an out-of-spec measurement. Once an out-of-spec measurement is made, the process includes the determination of the rate of change for the out-of-spec measurement. A slope signature is calculated based on the rate of change for the measured condition, which is compared against the slope signature library to determine a predicted time-to-failure based on the calculated slope signature, and outputting the predicted time-to-failure. The process can be used to modify the operation of the machine to extend the predicted time-to-failure.

13 Claims, 3 Drawing Sheets

(52) U.S. Cl.
CPC ....... *F04B 2201/02* (2013.01); *F04B 2205/01* (2013.01); *F04B 2205/05* (2013.01); *F04B 2205/10* (2013.01); *F04B 2205/11* (2013.01); *G05B 2219/36207* (2013.01)

(56) References Cited

U.S. PATENT DOCUMENTS

| | | |
|---|---|---|
| 2007/0140869 A1 | 6/2007 | St et al. |
| 2010/0106458 A1 | 4/2010 | Leu et al. |
| 2016/0090980 A1 | 3/2016 | Howard et al. |
| 2016/0217379 A1 | 7/2016 | Patri et al. |
| 2017/0030349 A1 | 2/2017 | Bassett et al. |
| 2017/0090457 A1 | 3/2017 | Pandurangan et al. |

\* cited by examiner

METHOD OF PREDICTING FAILURE EVENTS FOR RECIPROCATING COMPRESSORS

RELATED APPLICATIONS

This application claims the benefit of U.S. Provisional Patent Application Ser. No. 62/897,810 filed Sep. 9, 2019 entitled, "Method of Predicting Failure Events for Reciprocating Compressors," the disclosure of which is herein incorporated by reference.

FIELD OF THE INVENTION

This description relates generally to reciprocating compressors and more particularly, but not by way of limitation, to systems and methods for use in monitoring the health of reciprocating compressors.

BACKGROUND

Reciprocating compressors are used to pressurize gases in a variety of industrial applications. Reciprocating compressors include one or more reciprocating pistons, each housed within a corresponding cylinder assembly. The cylinder assemblies are typically mounted to a common compressor frame that supports the compressor on a platform or supporting base. A crankshaft within the compressor frame is driven by a prime mover, such as an electric motor or internal combustion engine. As the crankshaft rotates, it induces a reciprocating motion in a connecting rod that extends into the cylinder assembly to the piston assembly. The piston assembly then reciprocates within the cylinder assembly, thereby compressing gases within the cylinder head. Valves within the cylinder head control the intake and discharge of gases to the reciprocating compressor.

Many of the components within the reciprocating compressor are subjected to loading during use. Over time, seals and other precision parts may wear out, thereby reducing the efficiency of the reciprocating compressor. Additionally, increased loading on the connecting rod and piston assembly may induce material fatigue, which may result in decreased efficiency or damage to the compressor. It is therefore advisable to closely monitor key performance characteristics within the reciprocating compressor to determine if components are operating out of accepted tolerances.

In the past, the health of a reciprocating compressor has been evaluated using manual inspections and measurements that are subject to human error. In more advanced systems, manufacturers have employed sensors to monitor gas temperatures, gas pressures, vibration and other key performance metrics in hopes of determining the health of the reciprocating compressor. The output from these sensors can be used to produce data that can be interpreted to provide an indication of the compressor health, particularly where those sensors indicate that a particular component is operating "out of range." U.S. Pat. No. 10,288,058 entitled "Method and System for an Instrumented Piston Assembly," the disclosure of which is herein incorporated by reference, discloses several systems and methods for evaluating the health of a reciprocating compressor.

Although existing monitoring systems may be generally effective for identifying discrete problems in a reciprocating compressor, there remains a need for more advanced monitoring systems that provide predictive indications of pending failures. It is to this and other deficiencies in the prior art that the presently preferred embodiments are directed.

SUMMARY OF THE INVENTION

In some embodiments, the present invention provides a process for predicting the failure of a machine that includes a control system and a sensor configured to measure a condition within the machine. The process begins with the step of loading a slope signature library into the control system, in which the slope signature library correlates time-to-failure based on rates of change of the measured condition. The process continues with the steps of activating the machine, producing a signal from the sensor that is indicative of a first measurement (M1) taken at a first time (T1), and producing a signal from the sensor that is indicative of a second measurement (M2) taken at a second time (T2). The process continues with the step of determining the rate of change for the measured condition based on the difference between the first measurement (M1) and the second measurement (M2) with respect to the period between the first time (T1) and the second time (T2). Next, the process includes the steps of calculating a slope signature based on the determination of the rate of change for the measured condition, comparing the calculated slope signature against the slope signature library to determine a predicted time-to-failure based on the calculated slope signature, and outputting the predicted time-to-failure.

WRITTEN DESCRIPTION

Generally, the exemplary embodiments are directed at an improved system and methodology for measuring one or more operational parameters or conditions (each a "measurement") within a reciprocating compressor, evaluating the measurement over time to determine the rate of change (or "slope") of the measurement, correlating the slope to a slope signature library that is correlated with failure modes, and producing a prediction about the time-to-failure for one or more components within the reciprocating compressor. The systems of the exemplary embodiments can also be configured to update the slope signature/failure mode library through manual or machine learning processes based on measurements and component failure determinations. The systems of the exemplary embodiments can also be configured to automatically adjust the operation of the reciprocating compressor to reduce the risk of failure, to prolong equipment life or to improve operational efficiency.

Figure 1:
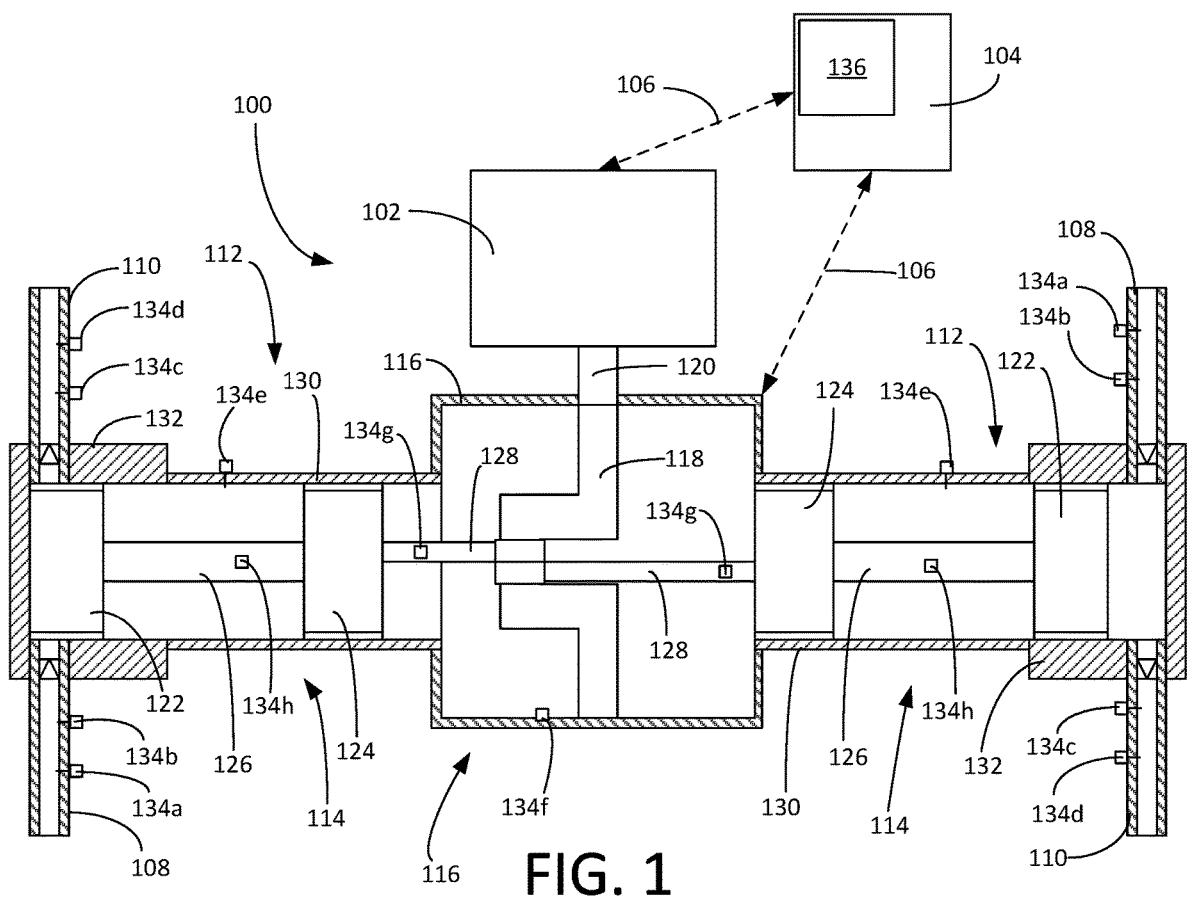
FIG. 1 is a depiction of a reciprocating compressor.

FIG. 1 presents a top, partial cross-sectional view of a reciprocating compressor 100. The reciprocating compressor 100 is driven by a prime mover 102. In some applications, the prime mover 102 is an electric motor or an internal combustion engine. The reciprocating compressor 100 and prime mover 102 are connected to a control system 104 through wireless or wired connections 106. It will be appreciated that the reciprocating compressor 100, prime mover 102 and control system 104 can be configured for operation in a wide variety of industrial applications in which the reciprocating compressor 100 is configured to receive gases through an intake 108, increase the pressure of the gases, and expel the pressurized gases through a discharge 110.

The reciprocating compressor 100 generally includes one or more cylinder assemblies 112, a running gear assembly 114 in each of the one or more cylinder assemblies, and a crankcase assembly 116. As depicted in FIG. 1, the reciprocating compressor 100 has two cylinder assemblies 112 that are connected to a common crankcase assembly 116. It will be appreciated that the reciprocating compressor 100 can include fewer or greater numbers of cylinder assemblies 112.

The crankcase assembly 116 includes a crankshaft 118 that is connected to a drive shaft 120, which is driven by the prime mover 102. The running gear assemblies 114 each include a piston 122, a cross head 124, piston rod 126 that connects the piston 122 to the cross head 124, and a connecting rod 128 that connects the cross head 124 to the crankshaft 118. The cylinder assemblies 112 each include a cross head guide 130 and a cylinder body 132. Each running gear assembly 114 resides within a corresponding cylinder assembly 112, such that the piston 122 reciprocates within the cylinder body 132.

As is well known in the art, the rotation of the crankshaft 118 by the prime mover 102 causes the connecting rods 128 to induce a linearly reciprocating motion in the cross heads 124, which is translated to the piston heads 122 through the piston rods 126. It will be appreciated that the reciprocating compressor 100 depicted in FIG. 1 and described herein is merely for illustrative purposes and that the exemplary embodiments of the monitoring and control systems will find utility in a wide variety of reciprocating compressors, pumps and other machines.

The reciprocating compressor 100 includes a plurality of sensors 134 that are positioned at various locations within the reciprocating compressor 100. The sensors 134 may be configured to measure any number of characteristics, including temperature, pressure, strain, torque, vibration, linear speed, rotational speed, fluid levels, sound, acoustics, and other observable characteristics. As depicted in FIG. 1, the sensors 134 include intake gas temperature sensors 134a, intake pressure sensors 134b, discharge gas temperature sensors 134c, discharge pressure sensors 134d, cylinder assembly vibration sensors 134e, crankcase assembly vibration sensors 134f, connecting rod strain sensors 134g, and piston rod strain sensors 134h. Each sensor 134 produces an output signal representative of the measurement taken by the sensor 134. It will be appreciated that additional sensors 134 may be deployed throughout the reciprocating compressor 100 and prime mover 102.

The control system 104 monitors the measurements taken by the sensors 134. In some embodiments, the control system 104 is also configured to adjust the operation of the reciprocating compressor 100 and prime mover 102 in response to measurements taken by the sensors 134. The control system 104 includes one or more computer processors and computer memory that are configured to run computer programs and process data. The computer programs, raw data and processed data can be stored on data storage devices within the control system 104 or connected to the control system 104. The control system 104 may be directly connected to the reciprocating compressor 100 or connected to the reciprocating compressor 100 through a network. In some embodiments, a control system 104 is configured to monitor a plurality of reciprocating compressors 100. The control system 104 may include a display monitor, printer or other output device 136 for presenting information to an operator, manufacturer or service technician.

The control system 104 is optimally configured to use measurements from the sensors 134 to identify potential operational problems with the reciprocating compressor 100 and to predict the time-to-failure of the reciprocating compressor 100 or discrete components within the reciprocating compressor 100. Unlike prior art control systems that simply identify an out-of-spec condition, the control system 104 is provided with predictive and adaptive computational processes that permit the control system 104 to estimate when a particular failure or change in operational conditions will occur based on the rate at which measured conditions are changing within the reciprocating compressor 100.

In exemplary embodiments, the control system 104 is provided with a slope signature library that provides a correlation between the rates of change of measurements taken by the sensors 134 with known failure points for each measurement. The slope signature library is a relational database that correlates the rate of change of a particular measurement (e.g., discharge gas temperature) with an anticipated failure point in time. The failure point can be defined as a decrease in operational efficiency, an actual physical failure of a component within the reciprocating compressor 100, or an arbitrary value or criteria established by the operator or manufacturer.

Figure 2:
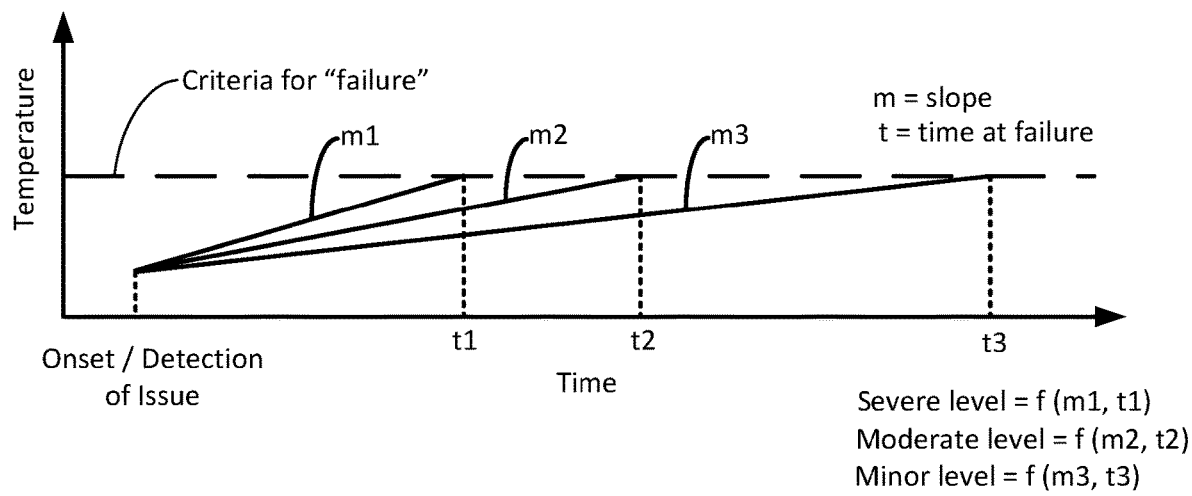
FIG. 2 is a depiction of slope determination for a failure mode based on measured temperatures within the reciprocating compressor of FIG. 1.

FIG. 2 presents a graph illustrating the determination of various slope signatures of temperature measurements recorded by a sensor 134 over time. A first slope (m1) represents a severe situation in which the temperature is rising rapidly, such that the slope signature predicts that the temperature will cross the failure criteria level at time (t1). A second slope (m2) represents a moderate level in which the temperature is predicted to cross the failure point at a later time (t2). The third slope (m3) represents a minor condition in which the temperature is not expected to cross the failure point until a much later time (t3). Thus, once an initial slope (m) is calculated, the control system 104 can use the slope and the known failure point to calculate the estimated time before the measured parameter reaches the failure point referred to as the "time-to-failure." It will be appreciated that the calculations performed by the control system 104 are iterative and that the slope (m) may change during the course of the measurements. The control system 104 can be configured to continuously update its slope and time-to-failure calculations using smoothing and regression algorithms based in part on the sampling rates of the applicable sensors 134.

In some embodiments, the trigger point for launching the failure prediction function is determined when a measured value within the reciprocating compressor 100 falls outside the established acceptable range. In other embodiments, the trigger point is based on a continuous or periodic evaluation of two or more slope signatures for measured values (using a moving regression) and running the values for these slopes through a decision tree to detect different failure modes based on correlating signatures (e.g., specific combinations of positive and negative slopes).

In exemplary embodiments, three main slope signatures are evaluated: suction temperature, discharge temperature and pressure ratio (based on suction and discharge pressures). The discharge temperature and pressure ratio are based on actual measurements. The suction temperature is a calculated value using actual measurements of driver speed (RPM), discharge temperature, pressure ratios and ambient temperature. Based on an automated evaluation of slope signatures for these three characteristic values, the control system 104 can predict the onset of one or more failures, the types of failures (failure mode), and the expected time until each failure occurs. In addition to improving the predictions for out-of-spec performance, the functions executed by the control system 104 can also be used to improve the accuracy of failure detection by confirming with slope signature analysis that an out-of-spec measurement suggestive of an impending failure is consistent with the predictions yielded by reference to the slope signature library. This aspect of the control system 104 is beneficial in reducing the number of false positive failure indicators, which increases operational uptime for the reciprocating compressor 100.

Figure 3:
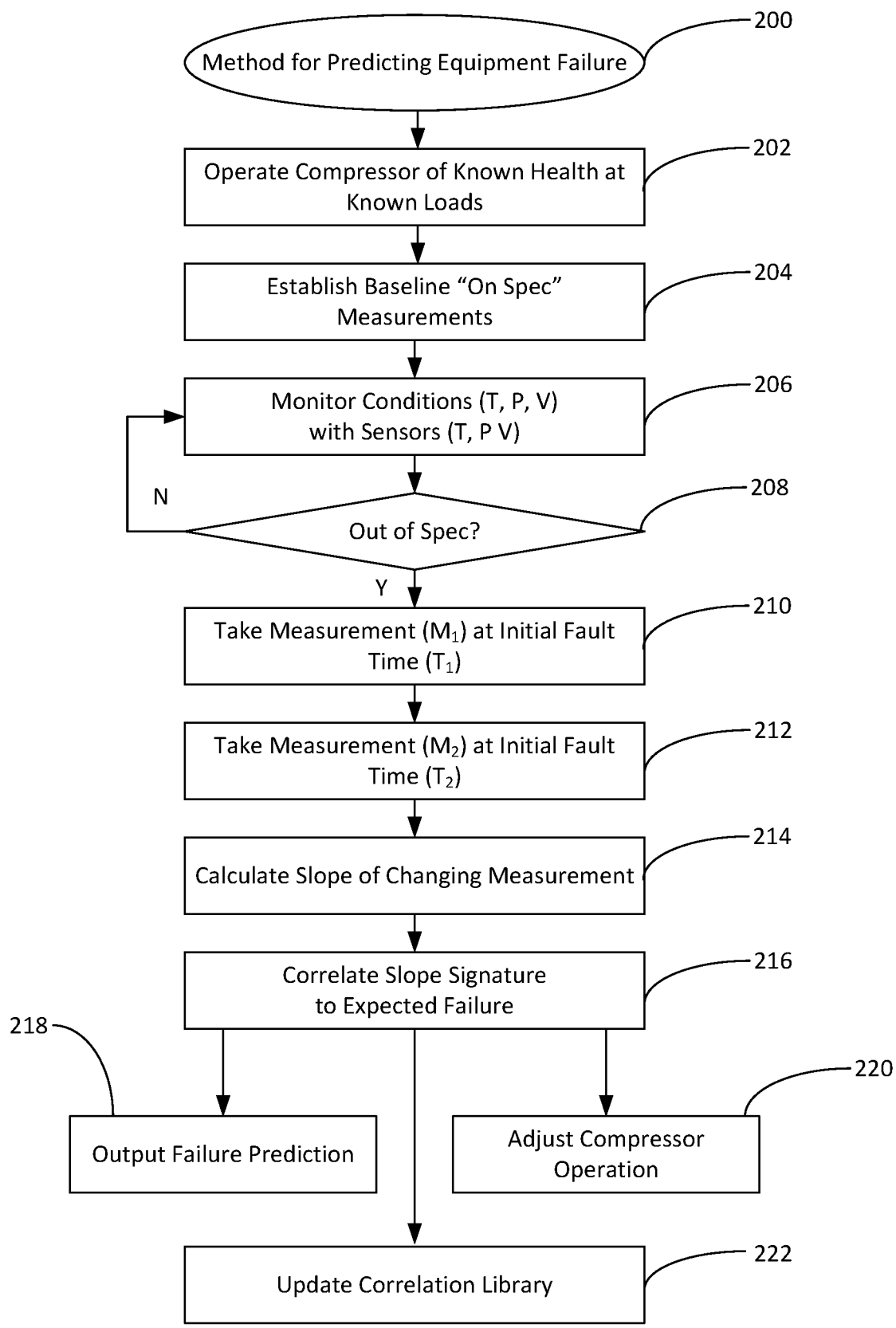
FIG. 3 is a process flow diagram for an exemplary embodiment of a method for predicting equipment failure of the reciprocating compressor of FIG. 1.

Turning to FIG. 3, shown therein is a process flow diagram for a method 200 for predicting the failure of equipment. The method 200 can be implemented and carried out as a computer program by the control system 104 or other computer system in communication with the sensors 134 of the reciprocating compressor 100. The method 200 begins at step 202, where the reciprocating compressor 100 is operated under an established load. For this step, it may be useful to ensure that the reciprocating compressor 100 is in good operating condition in accordance with manufacturer specifications and tolerances. At step 202, the sensors 134 produce signals that are representative of normal operating conditions. While the reciprocating compressor 100 is operating within established parameters, the control system 104 records optimal or baseline values for each measurement at step 204. The control system 104 generates a baseline library of the various measurements which are correlated to the known operating conditions. It will be appreciated that steps 202 and 204 may take place in a controlled environment during or following the manufacturing process, with the baseline library being stored within the control system 104 for future use during a commercial deployment of the reciprocating compressor 100.

At step 206, the reciprocating compressor 100 is operated in a production environment and the sensors 134 measure and report to the control system 104 current operational conditions within the reciprocating compressor 100. The sensors 134 can be configured, for example, to report the intake pressure and temperature, the discharge temperature and pressure, the power applied by the prime mover 102 and the vibration within the cylinder assemblies 112 and crankcase assembly 116. At step 208, the control system 104 queries whether any of the measurement signals produced by the sensors 134 indicate a condition that is out of spec by more than an allowable amount. If the sensors 134 detect conditions that remain within accepted tolerances, the method 200 returns to step 206 for continued monitoring.

If, however, one or more of the sensors 134 detect a condition that falls outside the allowable range, the method 200 progresses to step 210, where the initial measurement ($M_1$) is recorded with an initial timestamp ($T_1$). At step 212, a second measurement ($M_2$) is taken at a second time ($T_2$). Although only first and second measurements ($M_1$, $M_2$) are referenced in this description, it will be appreciated that the control system 104 and sensors 134 can be configured with sampling rates that produce multiple measurements within a very short period. Additionally, the sampling rate used by the control system 104 may vary between sensors 134 within the reciprocating compressor 100.

At step 214, the control system 104 evaluates the differences between at least the first and second measurements ($M_1$, $M_2$) with respect to time ($T_1$, $T_2$) and determines the rate of change or slope ("m") of the measurements. A slope signature is generated for the changing conditions, which may include multiple slopes that correspond to different periods of measurement. For example, if the sensor 134 is a temperature sensor that is observing an increasing temperature within the cylinder assembly 112, the changing temperature can be expressed in terms of how rapidly the temperature is changing within the cylinder assembly 112. This changing condition could, for example, indicate a failing seal within the cylinder body 132 or piston 122 that is permitting "blow-by" gases to increase the temperature within the cylinder assembly 112.

At step 216, the slope of the changing measurements is processed and evaluated by the control system 104. The control system 104 compares the calculated slope signature, which may include multiple slopes that correspond to different measurement periods, against the slope signature library for the measurement in question. Based on the comparison of the calculated slope signature against the slope signature library, the control system 104 can produce predictions about when the measurement in question will cross the failure point. The failure prediction is presented as an output from the control system 104 at step 218. The failure prediction can be used by an operator to schedule maintenance or adjust the operation of the reciprocating compressor 100 to reduce the risk of failure or prolong the time-to-failure.

In some embodiments, the control system 104 can be configured to automatically adjust the operation of the reciprocating compressor 100 at step 220 based on the failure predictions produced at step 216. For example, the control system 104 can be configured to automatically reduce the operating speed of the prime mover 102 in the event the control system 104 determines that continued operation will quickly result in costly failures to the reciprocating compressor 100.

In some embodiments, the control system 104 is configured to automatically update the slope signature library at step 222 based on observed measurements, failure modes and adjustments made by an operator to the reciprocating compressor 100. Through neural networks or machine learning, the control system 104 can be configured to continuously refine its slope signature library to improve the accuracy of the predictions and control operations made by the control system 104. In this way, the control system 104 can be configured to continuously adjust its operation based on intrinsic and extrinsic inputs and information. The control system 104 can be configured to apply a wide variety of comparative and statistical techniques, including, but not limited to, probability-density based usage indices, multivariate Hotelling T-squared distributions, association rule mining (ARM) algorithms, change point detection algorithms, and Bayesian and neural network-based anomaly detection and classification techniques.

Thus, the exemplary embodiments provide a system and method for predicting the time-to-failure of components within the reciprocating compressor 100. It is to be understood that even though numerous characteristics and advantages of various embodiments of the present invention have been set forth in the foregoing description, together with details of the structure and functions of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. It will be appreciated by those skilled in the art that the teachings of the present invention can be applied to other systems without departing from the scope and spirit of the present invention. For example, although the preferred embodiments are described in connection with the reciprocating compressor 100, the same systems and methods may find utility in monitoring other machines including, for example, pumping systems and turbine compressors.

It is claimed:

1. A process for predicting the failure of a reciprocating compressor that includes a control system and a sensor configured to measure a condition within the reciprocating compressor, the process comprising the steps of:
    loading a slope signature library into the control system, wherein the slope signature library correlates time-to-failure based on rates of change of the measured condition;
activating the reciprocating compressor;
    producing a signal from the sensor that is indicative of a first measurement (M1) taken at a first time (T1);
    producing a signal from the sensor that is indicative of a second measurement (M2) taken at a second time (T2);
    determining the rate of change for the measured condition based on the difference between the first measurement (M1) and the second measurement (M2) with respect to the period between the first time (T1) and the second time (T2);
    calculating a slope signature based on the determination of the rate of change for the measured condition;
    comparing the calculated slope signature against the slope signature library to determine a predicted time-to-failure based on the calculated slope signature;
outputting the predicted time-to-failure;
    automatically adjusting the operation of the reciprocating compressor based on the predicted time-to-failure; and
    wherein the measured condition is selected from the group consisting of intake gas temperature, intake pressure, discharge gas temperature, discharge pressure sensors, cylinder assembly vibration, crankcase assembly vibration, connecting rod strain, and piston rod strain.

2. The process of claim 1, further comprising the step of automatically updating the slope signature library based on the predicted time-to-failure.

3. The process of claim 1, wherein the measured condition is discharge gas temperature.

4. The process of claim 1, wherein following the step of activating the reciprocating compressor, the process comprises the step of establishing a baseline for the measured condition.

5. A process for predicting the failure of a reciprocating compressor that includes a control system and a sensor configured to measure a condition within the reciprocating compressor, the process comprising the steps of:
    loading a slope signature library into the control system, wherein the slope signature library correlates time-to-failure based on rates of change of the measured condition;
activating the reciprocating compressor;
    producing a signal from the sensor that is indicative of a first measurement (M1) taken at a first time (T1);
    producing a signal from the sensor that is indicative of a second measurement (M2) taken at a second time (T2);
    determining the rate of change for the measured condition based on the difference between the first measurement (M1) and the second measurement (M2) with respect to the period between the first time (T1) and the second time (T2);
    calculating a slope signature based on the determination of the rate of change for the measured condition;
    comparing the calculated slope signature against the slope signature library to determine a predicted time-to-failure based on the calculated slope signature;
    automatically adjusting the operation of the reciprocating compressor based on the predicted time-to-failure; and
    wherein the measured condition is selected from the group consisting of intake gas temperature, intake pressure, discharge gas temperature, discharge pressure sensors, cylinder assembly vibration, crankcase assembly vibration, connecting rod strain, and piston rod strain.

6. The process of claim 5, further comprising the step of outputting the predicted time-to-failure.

7. The process of claim 5, further comprising the step of automatically updating the slope signature library based on the predicted time-to-failure.

8. The process of claim 5, wherein the measured condition is discharge gas temperature.

9. The process of claim 5, wherein following the step of activating the reciprocating compressor, the process comprises the step of establishing a baseline for the measured condition.

10. A process for automatically controlling a reciprocating gas compressor that includes a control system and a sensor configured to measure a condition within the reciprocating gas compressor, the process comprising the steps of:
    loading a slope signature library into the control system, wherein the slope signature library correlates time-to-failure based on rates of change of the measured condition;
activating the reciprocating gas compressor;
    obtaining a baseline measurement of the condition within the reciprocating gas compressor;
producing a baseline library of the baseline measurement which correlates to a known operating conditions;
    determining that the measured condition falls outside the baseline measurement;
producing a signal from the sensor that is indicative of a first measurement (M1) taken at a first time (T1) after the measured condition falls outside the baseline measurement;
    producing a signal from the sensor that is indicative of a second measurement (M2) taken at a second time (T2) after the measured condition falls outside the baseline measurement;
    determining the rate of change for the measured condition based on the difference between the first measurement (M1) and the second measurement (M2) with respect to the period between the first time (T1) and the second time (T2);
    calculating a slope signature based on the determination of the rate of change for the measured condition;
    comparing the calculated slope signature against the slope signature library to determine a predicted time-to-failure based on the calculated slope signature;
    automatically adjusting the operation of the reciprocating compressor based on the predicted time-to-failure; and
    wherein the measured condition is selected from the group consisting of intake gas temperature, intake pressure, discharge gas temperature, discharge pressure sensors, cylinder assembly vibration, crankcase assembly vibration, connecting rod strain, and piston rod strain.

11. The process of claim 10, further comprising the step of outputting the predicted time-to-failure.

12. The process of claim 10, further comprising the step of automatically updating the slope signature library based on the predicted time-to-failure.

13. The process of claim 10, wherein the measured condition is discharge gas temperature.

\* \* \* \* \*